US008599703B2

(12) United States Patent
Dhillon et al.

(10) Patent No.: US 8,599,703 B2
(45) Date of Patent: Dec. 3, 2013

(54) SYSTEM AND METHOD TO DETERMINE RESOURCE STATUS OF END-TO-END PATH

(75) Inventors: Abinder S. Dhillon, Allen, TX (US); Shan Zhu, Plano, TX (US); Chandra Ganesh, Murphy, TX (US); Snigdho Chandra Bardalai, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 313 days.

(21) Appl. No.: 12/608,698

(22) Filed: Oct. 29, 2009

(65) Prior Publication Data
US 2011/0103223 A1  May 5, 2011

(51) Int. Cl.
*G01R 31/08* (2006.01)
(52) U.S. Cl.
USPC ....................................... 370/248
(58) Field of Classification Search
USPC ......... 370/231, 248, 252, 230, 235, 241, 238, 370/254, 351
See application file for complete search history.

(56) References Cited

U.S. PATENT DOCUMENTS

| | | | | |
|---|---|---|---|---|
| 5,995,503 | A * | 11/1999 | Crawley et al. | 370/351 |
| 6,801,496 | B1 * | 10/2004 | Saleh et al. | 370/221 |
| 7,161,910 | B2 * | 1/2007 | Maeno | 370/258 |
| 7,420,989 | B2 * | 9/2008 | Liu et al. | 370/468 |
| 7,554,996 | B2 * | 6/2009 | Previdi et al. | 370/401 |
| 7,660,254 | B2 * | 2/2010 | Vasseur et al. | 370/237 |
| 2006/0291485 | A1 * | 12/2006 | Thubert et al. | 370/401 |
| 2007/0041328 | A1 * | 2/2007 | Bell, IV | 370/248 |
| 2009/0303904 | A1 * | 12/2009 | Liu et al. | 370/254 |

OTHER PUBLICATIONS

Katz et al.; "Traffic Engineering (TE) Extensions to OSPF Version 2"; Network Working Group; Standards Track; RFC: 3630; pp. 14, Sep. 2003.
Nguyen et al.; "OSPF Out-of-Band Link State Database (LSDB) Resynchronization"; Network Working Group; RFC:4811; Informational; http://tools.ietf.org/html/rfc4811; pp. 11, Mar. 2007.

* cited by examiner

*Primary Examiner* — Anh Ngoc Nguyen
(74) *Attorney, Agent, or Firm* — Baker Botts L.L.P.

(57) ABSTRACT

Determining availability of an end-to-end physical path associated with reserved resources of a tunnel may include determining, for one or more nodes, a resource status for one or more resources integral to each node. Resource status for the integral resources of each node may be recorded in a message. Each node may communicate its associated message to one or more other nodes. At least one particular node of the one or more nodes may receive the messages communicated from the one or more nodes. The at least one particular node may store resource statuses for each of the one or more nodes. Based on an analysis of resource statuses, the at least one particular node may determine an availability of an end-to-end path of reserved resources of a tunnel including one or more of the nodes based on an analysis of resource statuses.

21 Claims, 4 Drawing Sheets

SYSTEM AND METHOD TO DETERMINE RESOURCE STATUS OF END-TO-END PATH

TECHNICAL FIELD

This invention relates generally to the field of communication networks and more specifically to determine the in-service state of resources in an end-to-end path.

BACKGROUND

Communication networks may include tunnels through which nodes can communicate packets. In certain systems, a tunnel is assigned numerous resources making up an end-to-end path for the tunnel. A node typically has numerous resources (e.g., internal fibers, cards, ports, equipment, etc.) through which data may be communicated. In certain cases, a source node does not know the resource status (e.g., availability, presence, or service state) of the resources at each node. If the source node attempts to set up a tunnel through a node in which one or more of such resources are not available or not in-service, the tunnel set up may fail.

SUMMARY OF THE DISCLOSURE

In accordance with the present invention, disadvantages and problems associated with previous techniques setting up tunnels may be reduced or eliminated.

In one embodiment, determining the availability of an end-to-end physical path associated with reserved resources of a tunnel includes determining, for one or more nodes, a resource status for one or more resources integral to each node. The resource status for the integral resources of each node may be recorded in a message. Each node may communicate its associated message to one or more other nodes. At least one particular node of the one or more nodes may receive the messages communicated from the one or more nodes. The at least one particular node may store the resource statuses for each of the one or more nodes. Based on an analysis of the resource statuses, the at least one particular node may determine an availability of an end-to-end path of reserved resources of a tunnel including one or more of the nodes based on an analysis of the resource statuses.

Certain embodiments of the invention may provide one or more technical advantages. A technical advantage of one embodiment may be that nodes may inform a source node of the resource statuses of resources integral to the nodes. The nodes may communicate link-state advertisements that include the resource statuses. Another technical advantage of one embodiment may be that a source node can analyze the resource statuses to determine whether an end-to-end path exists for reserved resources of a tunnel.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 4 of the drawings, like numerals being used for like and corresponding parts of the various drawings.

Figure 1:
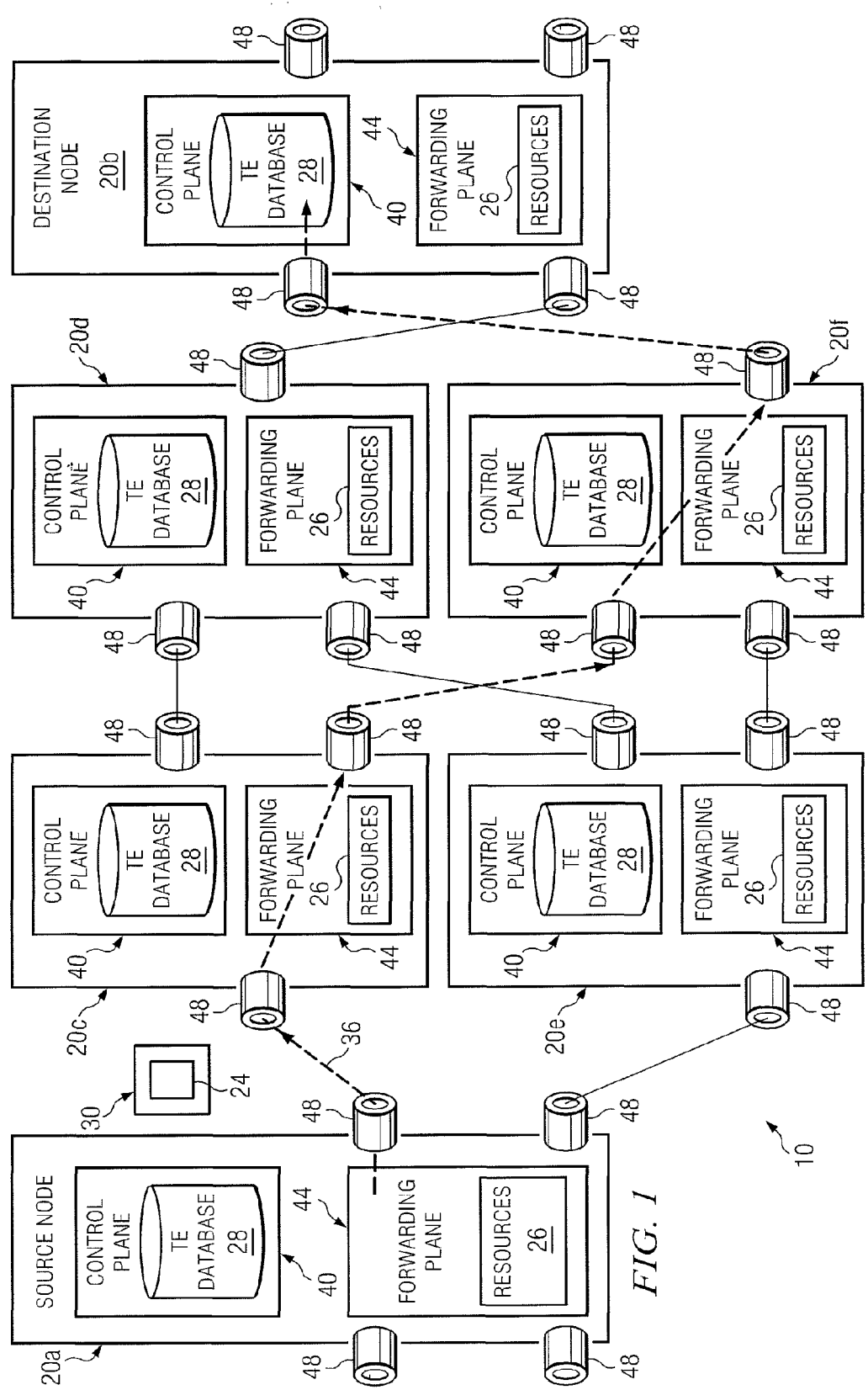
FIG. 1 illustrates an example of a system 10 in which a node 20 may determine the resource status of resources 26 of other nodes 20 in a communication path of system 10.

FIG. 1 illustrates an example of a system 10 in which a node 20 may determine the resource status of resources 26 of other nodes 20 in a communication path of system 10, in accordance with embodiments of the present disclosure. For example, a node 20 (e.g., node 20c) may send a message 30 that includes resource status information 24. Message 30 may comprise a link-state advertisement (LSA) that may provide resource status information 24. Resource status information 24 may indicate the resource status (e.g., availability, presence, or in-service state) of one or more resources 26 of the node communicating such information. A source node (e.g., node 20a) may use the resource status information 24 to determine if all resources 26 of a reserved end-to-end communication path or tunnel 36 exist and are in-service.

In some embodiments, system 10 may communicate information through signals such as optical signals. An optical signal may have any suitable data rate. Information may include voice, data, audio, video, multimedia, control, signaling, and/or other information.

In the illustrated example, system 10 includes nodes 20a-20f through which tunnel 36 may be set up. A node 20 may represent a Label Switching Router (LSR). A tunnel 36 may be a label switched path (LSP) that includes a sequence of nodes 20. Packets may travel from a source node 20a, through zero, one, or more intermediate nodes 20c and 20f, to a destination node 20b. In some embodiments, source node 20 may encapsulate packets in Multi-Protocol Label Switching (MPLS) packets. Intermediate nodes 20c and 20f may forward packets based on the MPLS encapsulation. Destination node 20b may de-encapsulate the MPLS packets to yield the original packets.

A node 20 may include a control plane 40, a forwarding plane 44, and ports 48. Control plane 40 may determine the path of tunnel 36 to destination node 20b. Control plane 40 may set up a routing table that specifies ports 48 through which packets for destination node 20b should be routed. Control plane 40 may include a traffic engineering (TE) database 28 that stores traffic management information, such as resource status information 24 of nodes 20.

Forwarding plane 44 may forward packets according to the routing table. Forwarding plane 44 may include one or more resources 26 for communicating packets. As used in this disclosure, a resource 26 may include any equipment, component, system, device, or apparatus utilized to communicate all or part of a packet and/or control the communication of all of part of a packet. Resources 26 may include, without limitation, fibers, splitters, multiplexers, demultiplexers, wavelength-division multiplexers (WDMs), dense wavelength-division multiplexers (DWDMs), and wavelength selective switches (WSS).

Resource status information 24 for a node 20 may describe a resource status including the availability, presence, and/or in-service state of various resources 26 of node 20 for use by tunnels 36. The resource status may indicate, for example, whether a resource is available or present at node 20 and/or whether such resource is correctly operating.

A node 20 (e.g., node 20b) may inform other nodes 20 (including source node 20a) of the resource status (e.g., availability, presence, and/or in-service state) of its resources 26 by sending a message 30 that includes resource status information 24. For example, resource status information 24 may be recorded in a link-state advertisement (LSA), such as a traffic engineering (TE) link LSA. Resource status information 24 may be recorded in the LSA any suitable manner. For example, resource status information 24 may be encoded as a sub-type-link-value (sub-TLV) of a TE link LSA by extending an Interior Gateway Protocol (IGP). Interior Gateway Protocol (IGP) extensions include an Open Shortest Path First-Traffic Engineering (OSPF-TE) extension and an Intermediate System to Intermediate System-Traffic Engineering (ISIS-TE) extension.

As another example, resource status information 24 for a particular node 20 may be recorded as an opaque (OPQ) object in a return message to a path request message. For instance, a particular node 20 (e.g., node 20b) may receive a path message in accordance with Resource Reservation Protocol (RSVP) or another protocol configured to reserve resources within system 10. In response to receipt of the path message the particular node may respond with a return message 30 (e.g., a RSVP RESV message) which includes resource status information 24 regarding the particular node 20.

Network system 10 may also utilize Resource Reservation Protocol (RSVP) or another protocol configured to reserve resources (e.g., bandwidth) within network system 10.

A node 20 may send other messages, such as link state advertisement messages for link state updates. In some embodiments, node 20b may send updates to resource status information 24 in link state advertisement messages.

A component of system 10, such as a node 20a-20f, may include an interface, logic, memory, and/or other suitable elements. An interface may receive input, send output, process the input and/or output, and/or perform other suitable operations. An interface may comprise hardware and/or software.

Logic may perform the operations of the component, for example, execute instructions to generate output from input. Logic may include hardware, software, and/or other logic, and may be stored in memory. Certain logic, such as a processor, may manage the operation of a component. Examples of a processor include one or more computers, one or more microprocessors, one or more applications, and/or other logic.

A memory may store information. A memory may comprise a computer-readable storage medium, such as computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable storage medium.

Modifications, additions, or omissions may be made to system 10 without departing from the scope of the invention. The components of system 10 may be integrated or separated. Moreover, the operations of system 10 may be performed by more, fewer, or other components. Additionally, operations of system 10 may be performed using any suitable logic. As used in this document, "each" may refer to each member of a set or each member of a subset of a set.

Figure 2:
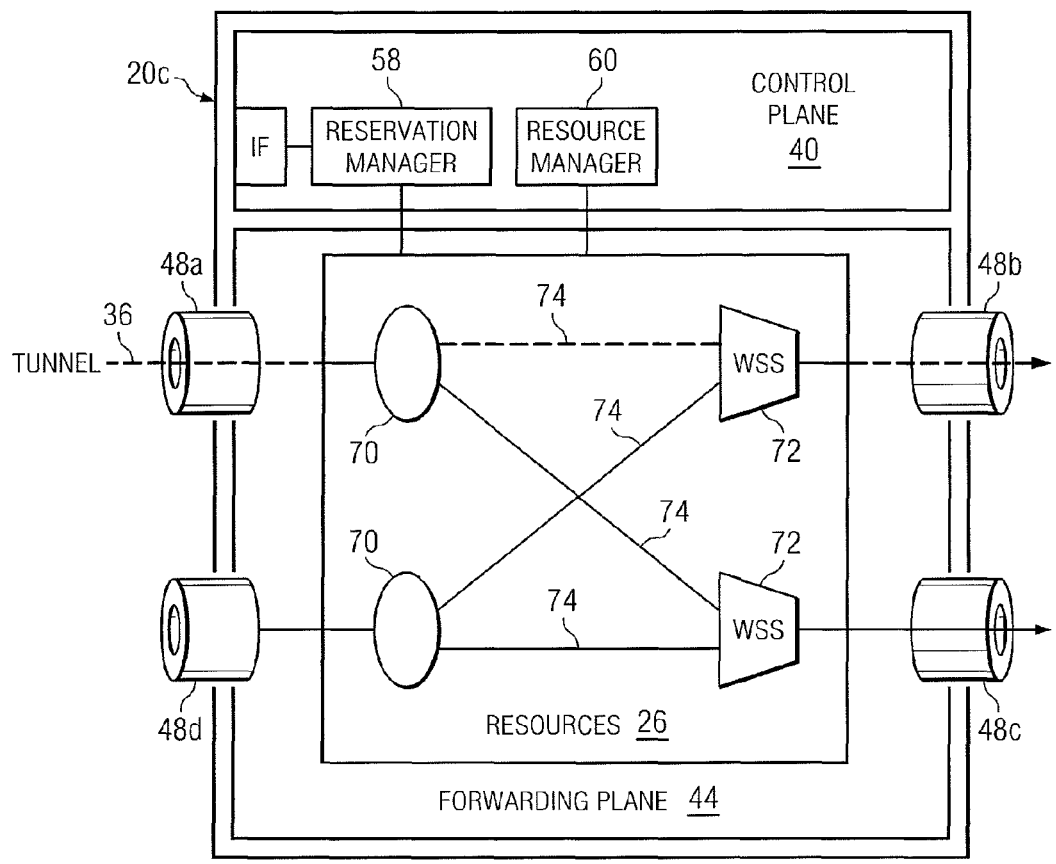
FIG. 2 illustrates an example of an intermediate node 20c that may be used with system 10 of FIG. 1.

FIG. 2 illustrates an example of an intermediate node 20c that may be used with system 10 of FIG. 1. Node 20c may include ports 48a-48d, resources 26, resource manager 60, and a reservation manager 58. In the particular embodiment depicted in FIG. 2, resources 26 may include splitters 70, internal fibers 74, and WSSs 72. A splitter 70 may represent an optical coupler or any other suitable optical component operable to split an optical signal into multiple copies of the optical signal and transmit the copies to other resources 26 within a node 20. A WSS 72 may comprise any suitable optical components operable to receive multiple optical signals and output a portion or all of one or more of the received signals. An internal fiber 74 may be coupled between a splitter 70 and a WSS 72 and may represent any fiber configured to transmit a signal between a splitter 70 and a WSS 72. An internal fiber 72 may include a Single-Mode Fiber (SMF), Enhanced Large Effective Area Fiber (E-LEAF), TrueWave® Reduced Slope (TW-RS) fiber, or other suitable fiber. Although specific resources 26 are depicted in FIG. 2, a node 20 may include any suitable type and/or number of resources 26.

Reservation manager 58 may reserve resources for tunnels 36 in accordance with Resource Reservation Protocol (RSVP) or other suitable protocol or standard. Resource manager 60 may determine resource status information 24, and may record information 24 in message 30 for distribution to other nodes 20. In some embodiments, resource manager 60 may determine the resource status of resources 26 at node 20, and record such information in a sub-TLV in a link-state advertisement.

Modifications, additions, or omissions may be made to node 20 without departing from the scope of the invention. The components of node 20 may be integrated or separated. Moreover, the operations of node 20 may be performed by more, fewer, or other components. For example, the operations of reservation manager 58 may be performed by more than one component. Additionally, operations of node 20 may be performed using any suitable logic.

Figure 3:
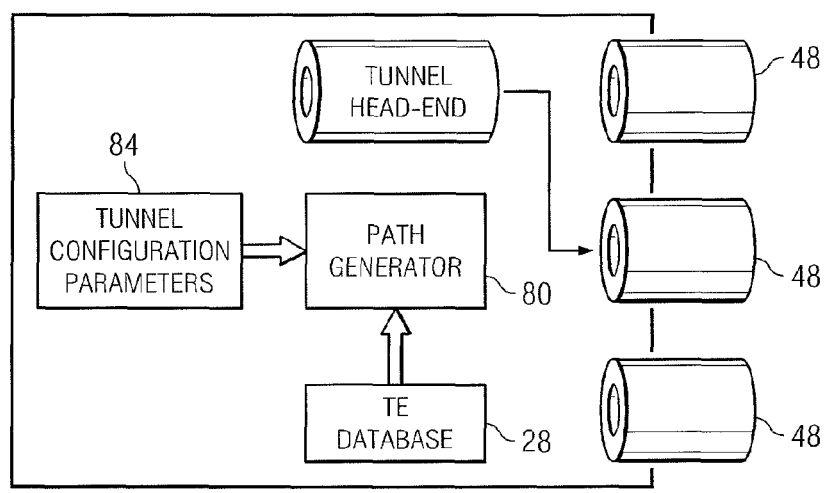
FIG. 3 illustrates an example of source node 20a that may be used with system 10 of FIG. 1.

FIG. 3 illustrates an example of source node 20a that may be used with system 10 of FIG. 1. Source node 20a may include a traffic engineering database 28, ports 48, and a path generator 80. Traffic engineering database 28 may store resource status information 24 that describes availability, presence and in-service state of resources 26 of nodes 20.

Path generator 80 may compute a path for tunnel 36, and may use a Constrained Shortest Path First (CSPF) technique to compute the path. The computed path may include one or more resources 26 of nodes 20. Path generator 80 may compute a path in accordance with tunnel configuration parameters 84. Tunnel configuration parameters 84 may designate the source node 20a of tunnel 36, destination node 20b of tunnel 36, and bandwidth required for tunnel 36.

After computing a path for tunnel 36, path generator 80 may reserve resources 26 for the tunnel via RSVP or other suitable protocol or standard. However, in many traditional networking systems, mere reservation of a path for tunnel 36 often does not ensure that all resources 26 throughout the path are indeed available, present, and/or in-service. Accordingly, if a source node 20 were to set the path for tunnel 36 to an "active state," and one or more resources were not available, absent, or not in-service, a physical end-to-end communication path would not be present, and any attempted communication would be likely to fail. In addition, in many traditional networking systems the source of such failure may not be readily identifiable.

However, in embodiments of the present disclosure, a source node 20 (e.g., node 20*a*), may be configured to analyze or process resource status information 24 stored in traffic engineering database 28 to determine the availability, presence, or in-service state of reserved resources 26 making up the path of tunnel 36. By analyzing such resource status information 24, node 20 may determine whether the reserved end-to-end path physically exists, and in instances where and end-to-end path does not exist, may determine the identity of resources which are unavailable, absent, or not in-service.

Modifications, additions, or omissions may be made to source node 20*a* without departing from the scope of the invention. The components of node 20*a* may be integrated or separated. Moreover, the operations of node 20*a* may be performed by more, fewer, or other components. Additionally, operations of node 20*a* may be performed using any suitable logic.

Figure 4:
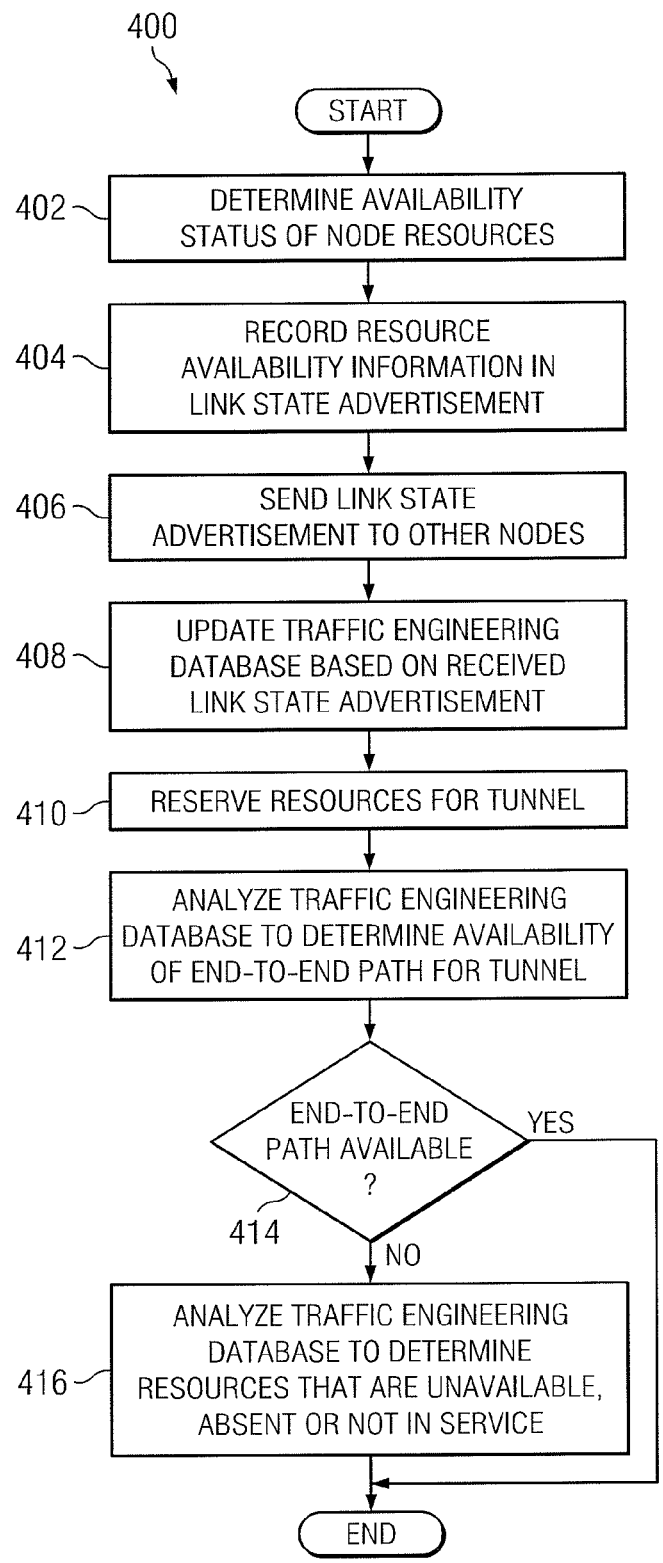
FIG. 4 illustrates an example of a method 400 for determining the in-service availability of an end-to-end communication path in system 10 of FIG. 1.

FIG. 4 illustrates an example of a method 400 for determining the in-service availability of an end-to-end communication path in system 10 of FIG. 1. The method may begin at step 402, where resource managers 60 of nodes 20 may determine the resource status (e.g, availability, presence, absence, in-service state) of the resources 26 comprising the individual nodes 20. At step 404, resource managers 60 may record the resource status information for their respective nodes in link state advertisements and place the link state advertisements in messages 30. At step 406, nodes 20 may communicate link state advertisements (including resource status information) in messages 30. At step 408, the various nodes 20 may receive the link state advertisements communicated from other nodes 20 at step 406 and update their respective traffic engineering databases 28 accordingly.

At step 410, a source node 20 (e.g., node 20*a*) may reserve resources for a tunnel 36 (e.g., by communicating a message in accordance with RSVP or other suitable protocol or standard). At step 412, the source node 20 may analyze its traffic engineering database 28 to determine the availability of an end-to-end path for the tunnel 36. For example, traffic engineering database 28 may include status information for the resources 26 of the various nodes 20 in system 10. By analyzing its traffic engineering database 28, a source node 20 may determine if one or more resources 26 making up the reserved path for the tunnel are not available, absent, or not in-service, thus indicating that an end-to-end path is not available using the reserved resources.

At step 414, if an end-to-end path is available, method 400 may end. Otherwise, if an end-to-end path is not available, method 400 may proceed to step 416 where the source node 20 may analyze its traffic engineering database 28 to determine the identity of the one or more resources that are not available, absent, or not in-service. After step 416, method 400 may end.

Modifications, additions, or omissions may be made to method 400 without departing from the scope of the invention. The method may include more, fewer, or other steps. Additionally, steps may be performed in any suitable order.

Figure 5:
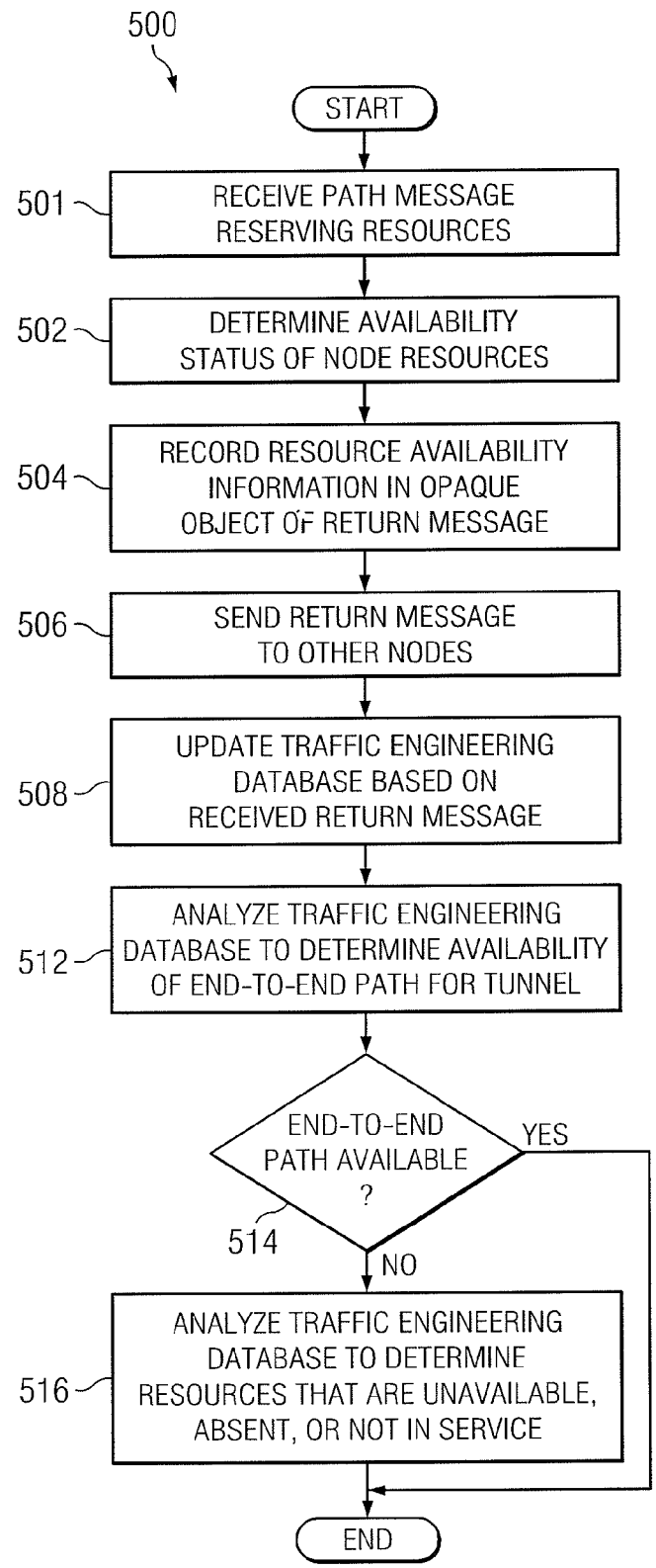
FIG. 5 illustrates another example of a method 500 for determining the in-service availability of an end-to-end communication path in system 10 of FIG. 1.

FIG. 5 illustrates an example of a method 500 for determining the in-service availability of an end-to-end communication path in system 10 of FIG. 1. The method may begin at step 501, where a node 20 may receive a path message (e.g., an RSVP PATH message) another node 20, the path message configured to reserve resources for tunnel 36 in system 10. At step 502, where resource manager 60 of the node 20 receiving the path message may determine the resource status (e.g, availability, presence, absence, in-service state) of the resources 26 comprising the node 20. At step 504, resource manager 60 may record the resource status information for its respective nodes in an opaque object and place the opaque object in a return message 30. At step 506, the node 20 may communicate the return message (including resource status information) to the source node of the path message in return message 30. At step 508, the source node 20 for the path message may receive the return messages 30 communicated from nodes 20 at step 506 and update its respective traffic engineering database 28 accordingly.

At step 512, the source node 20 may analyze its traffic engineering database 28 to determine the availability of an end-to-end path for the tunnel 36. For example, traffic engineering database 28 may include status information for the resources 26 of the various nodes 20 in system 10. By analyzing its traffic engineering database 28, a source node 20 may determine if one or more resources 26 making up the reserved path for the tunnel are not available, absent, or not in-service, thus indicating that an end-to-end path is not available using the reserved resources.

At step 514, if an end-to-end path is available, method 500 may end. Otherwise, if an end-to-end path is not available, method 500 may proceed to step 516 where the source node 20 may analyze its traffic engineering database 28 to determine the identity of the one or more resources that are not available, absent, or not in-service. After step 516, method 500 may end.

Modifications, additions, or omissions may be made to method 500 without departing from the scope of the invention. The method may include more, fewer, or other steps. Additionally, steps may be performed in any suitable order.

Certain embodiments of the invention may provide one or more technical advantages. A technical advantage of one embodiment may be that a node informs other nodes of resource status of resources at the node. The node sends a link-state advertisement that indicates the number of available traffic management resources. Another technical advantage of one embodiment may be that a source node can use the resource status information to determine if reserved resources making up a tunnel provide a physical end-to-end communication path.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method for determining the availability of an end-to-end physical path associated with reserved resources of a tunnel, comprising:

determining, for a plurality of optical network nodes, a resource status for one or more resources of each node, where the resources comprise internal optical components of each node;

recording, for each node, the resource status for its resources in a message;

communicating, by each node, its associated message to the other nodes;

receiving, by at least one particular node of the plurality of nodes, the messages communicated from the other nodes;

storing, by the at least one particular node, the resource statuses for each of the other nodes;

determining, by the at least one particular node, an availability of an end-to-end path of reserved resources of the tunnel including one or more of the other nodes based on an analysis of the resource statuses received from the other nodes; and determining, by the at least one particular node, an identity of one or more resources of the one or more nodes whose resource status prevents the availability of the end-to-end path.

2. The method of claim 1, wherein recording the resource status further comprises recording the resource status in an Interior Gateway Protocol (IGP) extension.

3. The method of claim 1, wherein recording the resource status further comprises recording the resource status in an Open Shortest Path First-Traffic Engineering (OSPF-TE) extension.

4. The method of claim 1, wherein recording the resource status further comprises recording the resource status in an Intermediate System to Intermediate System-Traffic Engineering (ISIS-TE) extension.

5. The method of claim 1, wherein recording the resource status further comprises recording the resource status in a Reservation Resource Protocol (RSVP) opaque object.

6. The method of claim 1, wherein each message is a link state advertisement.

7. The method of claim 1, wherein each message is a return message issued in response to a received path message.

8. The method of claim 1, further comprising:
establishing the tunnel by reserving one or more resources of the one or more nodes to form the tunnel; and
determining the availability of the end-to-end path of reserved resources of the tunnel in response to the reservation of the one or more resources.

9. The method of claim 1, further comprising wherein reserving one or more resources includes communicating a Resource Reservation Protocol path message.

10. An apparatus operable to determine the availability of an end-to-end physical path associated with reserved resources of a tunnel, comprising:
a processor; one or more memories; and
logic embodied in the one or more memories and configured, when executed by the processor, to:
determine, for a plurality of optical network nodes, a resource status for one or more resources of each node, where the resources comprise internal optical components of each node;
record, for each node, the resource status for its resources in a message;
communicate, for each node, its associated message to the other nodes;
receive the messages communicated from the other nodes;
store the resource statuses for each of the other nodes;
determine an availability of an end-to-end path of reserved resources of the tunnel including one or more of the other nodes based on an analysis of the resource statuses received from the other nodes; and
determine an identity of one or more resources of the one or more nodes whose resource status prevents the availability of the end-to-end path.

11. The apparatus of claim 10, the logic further configured to record the resource status by recording the resource status in an Interior Gateway Protocol (IGP) extension.

12. The apparatus of claim 10, the logic further configured to record the resource status by recording the resource status in an Open Shortest Path First-Traffic Engineering (OSPF-TE) extension.

13. The apparatus of claim 10, the logic further configured to record the resource status by recording the resource status in an Intermediate System to Intermediate System-Traffic Engineering (ISIS-TE) extension.

14. The apparatus of claim 10, the logic further configured to record the resource status by recording the resource status in a Reservation Resource Protocol (RSVP) opaque object.

15. The apparatus of claim 10, wherein each message is a link state advertisement.

16. The apparatus of claim 10, wherein each message is a return message issued in response to a received path message.

17. The apparatus of claim 10, the logic further configured to:
establish the tunnel by reserving one or more resources of the one or more nodes to form the tunnel; and
determine the availability of the end-to-end path of reserved resources of the tunnel in response to the reservation of the one or more resources.

18. The apparatus of claim 10, the logic further configured to reserve the one or more resources includes communicating a Resource Reservation Protocol path message.

19. A non-transitory computer-readable storage medium comprising logic for determining the availability of an end-to-end physical path associated with reserved resources of a tunnel, the logic when executed by a computer operable to:
determine, for a plurality of optical network nodes, a resource status for one or more resources of each node, where the resources comprise internal optical components of each node;
record, for each node, the resource status for its resources in a message;
communicate, for each node, its associated message to the other nodes;
receive the messages communicated from the other nodes;
store the resource statuses for each of the other nodes;
determine an availability of an end-to-end path of reserved resources of the tunnel including one or more of the other nodes based on an analysis of the resource statuses received from the other nodes; and
determine an identity of one or more resources of the one or more nodes whose resource status prevents the availability of the end-to-end path.

20. The non-transitory computer-readable storage medium of claim 19, wherein each message is a link state advertisement.

21. The non-transitory computer-readable storage medium of claim 19, wherein each message is a return message issued in response to a received path message.

* * * * *